(12) United States Patent
Ressler et al.

(10) Patent No.: US 12,498,118 B2
(45) Date of Patent: Dec. 16, 2025

(54) FIRE PIT HEAT DEFLECTOR

(71) Applicant: Lamplight Farms Incorporated, Menomonee Falls, WI (US)

(72) Inventors: Kyle Ressler, West Bend, WI (US); Andrew Alan Harmeling, Milwaukee, WI (US); Daniel J. Knight, Murfreesboro, TN (US)

(73) Assignee: Lamplight Farms Incorporated, Menomonee Falls, WI (US)

( * ) Notice: Subject to any disclaimer, the term of this patent is extended or adjusted under 35 U.S.C. 154(b) by 386 days.

(21) Appl. No.: 18/123,730

(22) Filed: Mar. 20, 2023

(65) Prior Publication Data

US 2023/0296254 A1 Sep. 21, 2023

Related U.S. Application Data

(60) Provisional application No. 63/321,178, filed on Mar. 18, 2022.

(51) Int. Cl.
*F24B 1/195* (2006.01)

(52) U.S. Cl.
CPC .................................. *F24B 1/1957* (2013.01)

(58) Field of Classification Search
CPC ........ F24B 1/1957; F24B 1/192; F24B 1/181; F24C 1/16
See application file for complete search history.

(56) References Cited

U.S. PATENT DOCUMENTS

| | | | |
|---|---|---|---|
| 5,094,223 A | 3/1992 | Gonzalez | |
| 6,851,423 B2 * | 2/2005 | Klemming | F24B 1/181 126/190 |
| 11,774,110 B2 | 10/2023 | Kessler | |
| 11,859,827 B1 * | 1/2024 | Redlinski | F24B 1/1957 |
| 2004/0211410 A1 * | 10/2004 | Kuelbs | F24B 1/192 126/519 |
| 2012/0196232 A1 | 8/2012 | Miller | |
| 2013/0206131 A1 | 8/2013 | Hood | |
| 2017/0114996 A1 | 4/2017 | Moneyhun | |
| 2021/0018180 A1 | 1/2021 | Jan et al. | |
| 2022/0170637 A1 | 6/2022 | Ressler et al. | |
| 2023/0151967 A1 | 5/2023 | Weilert et al. | |

\* cited by examiner

*Primary Examiner* — Alfred Basichas
(74) *Attorney, Agent, or Firm* — GableGotwals; David G. Woodral

(57) ABSTRACT

A heat deflector for use with a fire pit has at least one heat deflector panel, and a support structure engaged with the at least one heat deflector panel and supporting the at least one heat deflector panel in a spaced apart relationship with respect to the fire pit.

17 Claims, 12 Drawing Sheets

FIRE PIT HEAT DEFLECTOR

CROSS-REFERENCE TO RELATED CASES

This application claims the benefit of U.S. provisional patent application Ser. No. 63/321,178, filed on Mar. 18, 2022, and incorporates such provisional application by reference into this disclosure as if fully set out at this point.

FIELD OF THE INVENTION

This disclosure relates to outdoor fire pits in general and, more specifically, to a device for increasing heating effect and utility of such fire pits.

BACKGROUND OF THE INVENTION

Outdoor fire pits provide a location for enjoying an outdoor fire, either as a permanent installation such as on a patio, or as a portable device at a campsite or other location. Fire pits may contain both the fire and the resultant ashes. Various ash handling mechanisms may be provided. Some fire pits provide particular control over combustion air to reduce smoke and otherwise control burn characteristics.

By the nature of their construction, a fire pit will block some of the radiant heat from the fire inside. Therefore, in the past, the utility of the fire pit has been a trade off against having a fire that is less warming for those occupying an area around the fire pit.

What is needed is a system, device, and method for addressing the above and related concerns.

SUMMARY OF THE INVENTION

The invention of the present disclosure, in one aspect thereof, comprises a heat deflector for use with a fire pit comprising at least one heat deflector panel, and a support structure engaged with the at least one heat deflector panel and supporting the at least one heat deflector panel in a spaced apart relationship with respect to the fire pit.

In some embodiments, the at least one heat deflector panel is supported in the spaced apart relationship with respect to the fire pit in a horizontal orientation.

The support structure may comprise a support stand having at least one leg extending between the at least one heat deflector panel and the fire pit. The support structure may comprise a support stand having a plurality of legs extending between the at least one heat deflector panel and the fire pit. In some cases, at least one of the plurality of legs is attached to the heat deflector panel via a hinge allowing the at least one of the plurality of legs to fold toward a center of the heat deflector panel.

In some embodiments, the support structure comprises a mesh enclosure interposing the at least one heat deflector panel and the fire pit. The mesh enclosure may comprise a plurality of frustoconical mesh enclosures.

In further embodiments, the support structure comprises a mesh enclosure supporting multi-legged stand that is joined to the deflector panel. A domed mesh cover may be atop the mesh enclosure inside the stand.

In some cases, the at least one heat deflector panel is substantially flat. The at least one heat deflector panel may be domed. The at least one heat deflector panel may be dished at least on a center portion thereof. In some embodiments, the at least one heat deflector panel comprises at least two heat deflector panels in a spaced apart relationship with respect to one another. A handle may be affixed above the at least one heat deflector panel.

The invention of the present disclosure, in another aspect thereof, comprises a heat deflector with a deflector panel, and a support structure that engages the fire pit and supports the deflector panel above the open top spaced apart from the open top of the fire pit. In this case, the support structure provides at least one mesh portion circumscribing the open top of the fire pit.

In some embodiments, the support structure comprises at least one frustoconical mesh enclosure engaging the fire pit at the widest end of the mesh enclosure, and the mesh enclosure is sized to fit into the open top of the fire pit when the mesh enclosure is inverted.

The heat deflector may further comprise at least one additional frustoconical mesh enclosure interposing the at least one frustoconical mesh enclosure and the deflector panel.

In various embodiments, the support structure further comprises a multi-legged stand defining an opening between the open top of the fire pit and the deflector panel.

The invention of the present disclosure, in another aspect thereof, comprises a heat deflector for use with a fire pit. The heat deflector includes at least one heat deflector panel, and at least one support member engaged with the fire pit and the at least one deflector panel. Here, the at least one heat deflector panel is supported by the at least one support member in a spaced apart relationship with the fire pit such that radiant heat from the fire pit is reflected by the heat deflector and an opening is maintained between the at least one heat deflector panel and the fire pit allowing access to an open top of the fire pit.

DETAILED DESCRIPTION OF THE PREFERRED EMBODIMENTS

Figure 1A:
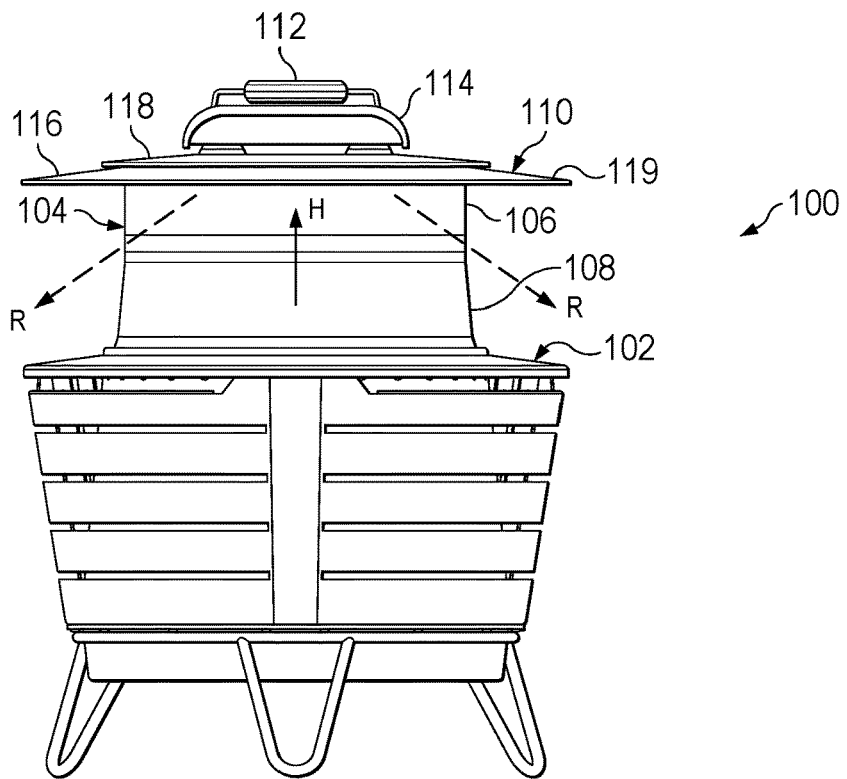
FIG. 1A is a side view of a fire pit with a heat deflector in an operational configuration according to aspects of the present disclosure.
Figure 1B:
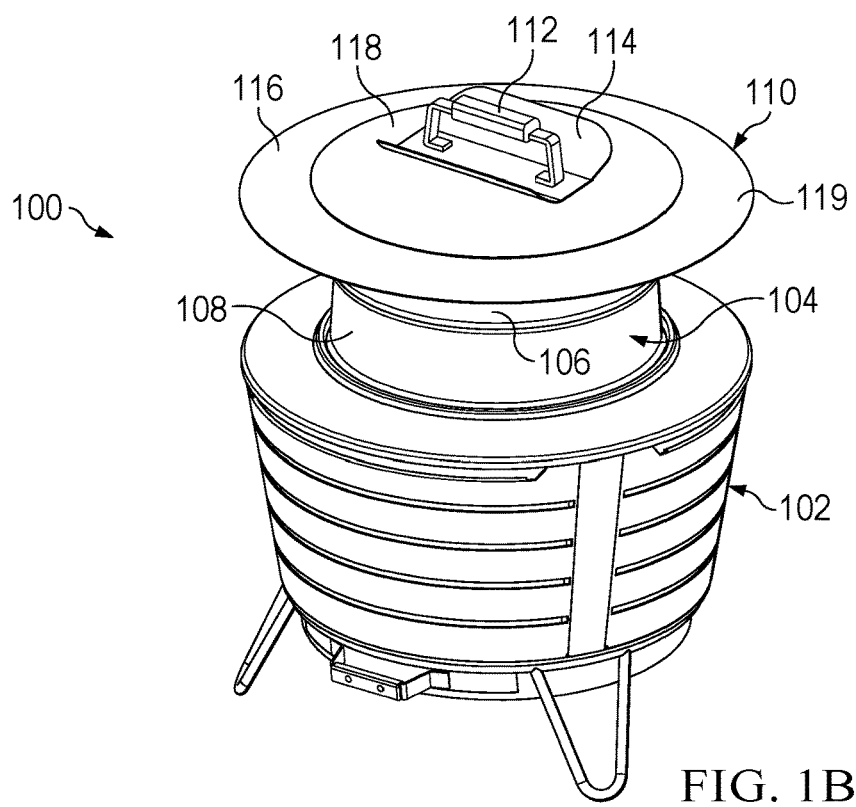
FIG. 1B is a perspective view of the fire pit with heat deflector of FIG. 1A in an operational configuration.
Figure 1C:
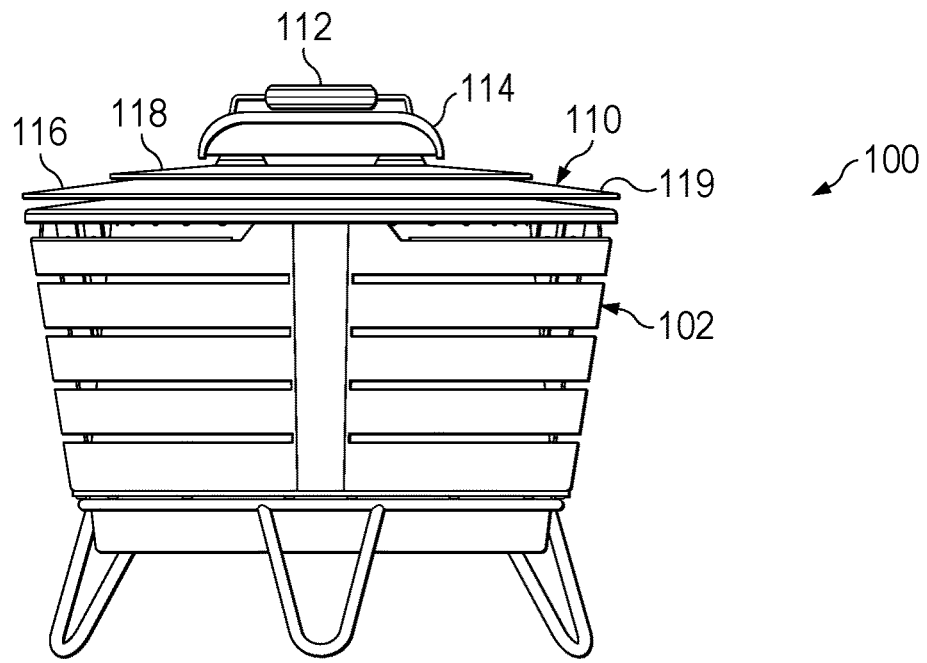
FIG. 1C is a side view of the fire pit with heat deflector of FIG. 1A in a stowed configuration.
Figure 1D:
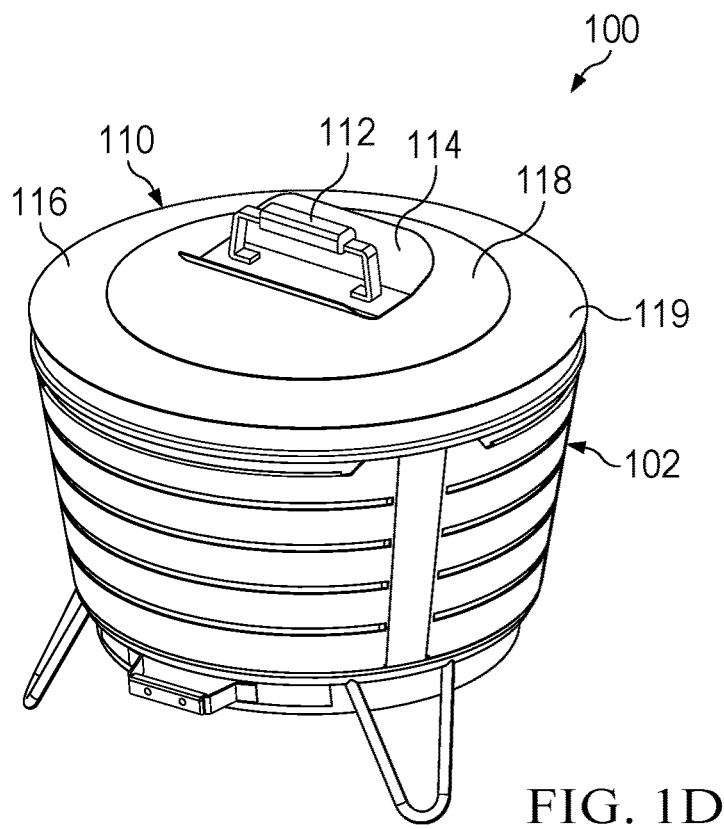
FIG. 1D is a perspective view of the fire pit with heat deflector of FIG. 1A in a stowed configuration.
Figure 1E:
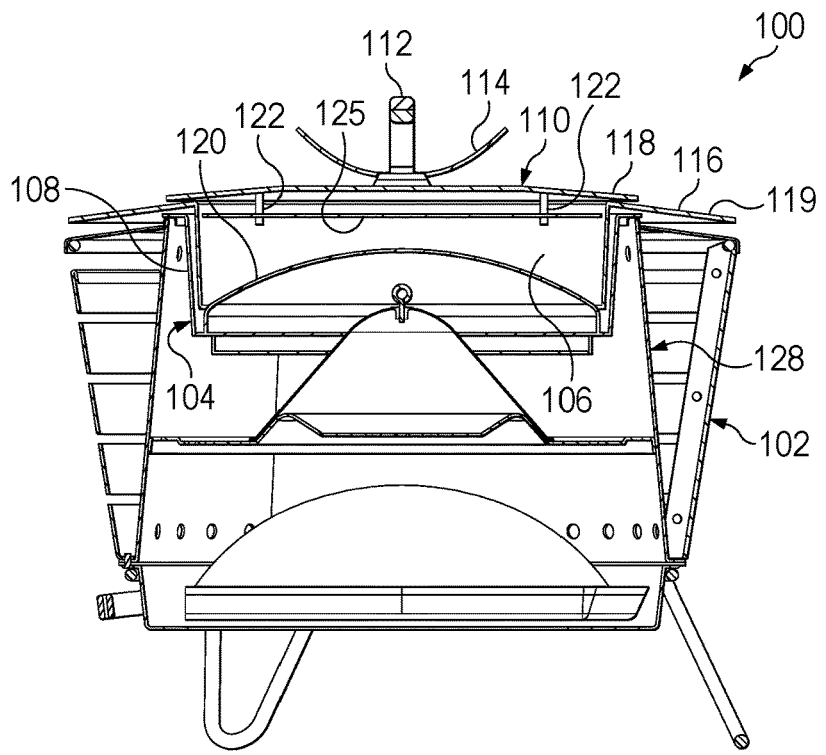
FIG. 1E is a side cutaway view of the fire pit with heat deflector of FIG. 1A in a stowed configuration.

Referring now to FIG. 1A a side view of a fire pit 100 with a heat deflector 110 shown in an operational configuration according to aspects of the present disclosure. FIG. 1B is a perspective view of the operational configuration of FIG. 1A. Also shown are stowed configurations in side view (FIG. 1C), perspective view (FIG. 1D), and side cutaway view (FIG. 1E).

In various embodiments, the fire pit 100 may comprise a fire pit base 102. The base 102 may comprise a standalone fire pit as known in the art (either permanently installed, or portable), or a fire pit base implemented according to the present disclosure. As discussed further below, the fire pit base 102 may provide a combustion engine (128, FIG. 1E) that provides an open top (1112, FIG. 11) when/if the heat deflector 110 is not present. In other embodiments, discussed further below, heat deflectors may be constructed such that the presence of an open fire pit top is maintained.

In various embodiments, the heat deflector 110 comprises a support structure 104 that elevates one or more reflector panels some distance above (e.g., spaced apart from) what would otherwise be the open top 1112 of the fire pit base 102 such that radiant heat is reflected downward and/or outward away from the fire pit 100 for increased heating around the fire pit 100. Reflector panels may be supported in a generally horizontal orientation over the fire pit base 102, though the panels are not necessarily flat and/or may have features rending portions of the reflector panels non-horizontal as discussed further below. In FIG. 1A, an exemplary radiant heat flow is shown by large arrow 'H' and exemplary reflected heat is shown by large dotted arrows 'R'. It should be understood that all angles, radiant heat pathways, and particular sources of primary heat from the fire pit base 102 are not necessarily represented by the illustrated arrows.

Placement of the heat deflector 110 may also have an effect on convective gas flows and thereby further alter the heating characteristics of the fire pit 100. Generally, the effect of the heat deflector 110 will be to increase perceived heat radially surrounding the fire pit 100 and at the surrounding support or ground surface of the fire pit 100. This increased heating surrounding the fire pit 100 radially and below the fire pit primarily or exclusively comes from heat that would otherwise escape or be radiated primarily upwards from the fire pit base 102 and thereby constitute wasted energy.

The support structure 104 may comprise one or more screened or mesh enclosures such as upper mesh enclosure 106 and lower mesh enclosure 108. These may be cylindrical, frustoconical, or have other shapes. Although they are denoted as enclosures, the enclosures 106, 108 may be open at a top and bottom thereof and be placed to as to circumscribe all of a portion of a top of a fire pit, including any top opening(s). The enclosures 106, 108 may, in conjunction with other components of the heat deflector 110, enclose the top opening of the fire pit base 102. The lower mesh enclosure 108 may fit onto the base 102 and support the upper mesh enclosure 106.

As both the upper mesh enclosure 106 and the lower mesh enclosure 108 may have a frustoconical structure, but open at both ends, they may have one end with a larger radius than the opposite end. Moreover, the enclosures 106, 108 may differ in size. As shown in FIG. 1A, the enclosures 106, 108 are placed with narrowed rends together and large ends away from one another. As discussed further below, the lower enclosure 108 may be inverted to receive the upper enclosure and may, in turn, fit partially or completely into the fire pit base 102 for storage. In some embodiments, a single mesh enclosure may be provided as the support structure 104.

The heat deflector 110 may comprise a lower panel 116 that may extend over the base 102 and/or support structure 104. An upper panel 118 may fit atop the lower panel 116. The upper panel 118 may attach to the lower panel 116 in a spaced apart relationship via spacers 122 (FIG. 1E) or standoffs to reduce heat transfer from the lower panel 116 to the upper panel 118. The lower panel 116 may be curved downward at least on an outer portion 119 thereof. The lower panel 116 may be flat or planar on center portion (125, FIG. 1E) thereof. The upper panel 118 may have a central flat portion or it may be domed, downwardly convex, or curved downward across its entire area as shown. It can be seen that the upper panel 116 does not extend completely to the edge of the lower panel 118 but does cover the central flat portion 125.

A handle 112 may be provided for removal or manipulation of the deflector 110. A heat shield 114 may isolate the handle from radiative heat from the lower panel 116 and/or upper panel 118. As shown in FIGS. 1A-1E, the heat shield 114 may have the shape of an opened ended trough, or a portion of a cylindrical wall wrapping partially around the handle 112.

As shown in FIG. 1E, the base 102 may comprise a combustion engine 128. This may comprise an internal mechanism for controlling and manipulating combustion in the base 102 as is known in the art or as implemented according to the present disclosure. In some embodiments, the combustion engine 128 may be constructed as described, for example, in U.S. Pat. No. 11,092,342 to Harrington et al., hereby incorporated by reference as if set out fully in its entirety. For purposes of the present disclosure, the combustion engine 128 may provide a location in which solid fuels, including cord wood or pellets, are burned for heat, visual effect, or other purposes. The combustion engine 128 may contain various fuel supports, ash handling systems, and air flow control mechanisms and may have an open top for flames and combustion products to escape. The combustion engine 128 could also be much simpler and provide only a space for fuel to be combusted. When the fire pit 100 is nonoperational (e.g., is does not contain a fire or active combustion products, and/or is cooled) it may be used as a storage space for various heat deflectors as described in the present disclosure. FIG. 1E illustrates a particular arrangement for the heat deflector 110 when the same is stowed in the combustion engine 128 for storage and/or transport.

In the stowed configuration, the lower mesh enclosure 108 may be inverted and placed partially, completely, or substantially completely into the base 102 and/or engine 128. The upper mesh enclosure 106 may nest inside the lower enclosure 108 within the base 102 and/or engine 128. As discussed further below, some embodiments may include an upper screen or mesh dome 120, which may be nested in upper mesh enclosure 106 and/or lower mesh enclosure 108 within the base 102 and/or engine 128.

Figure 2:
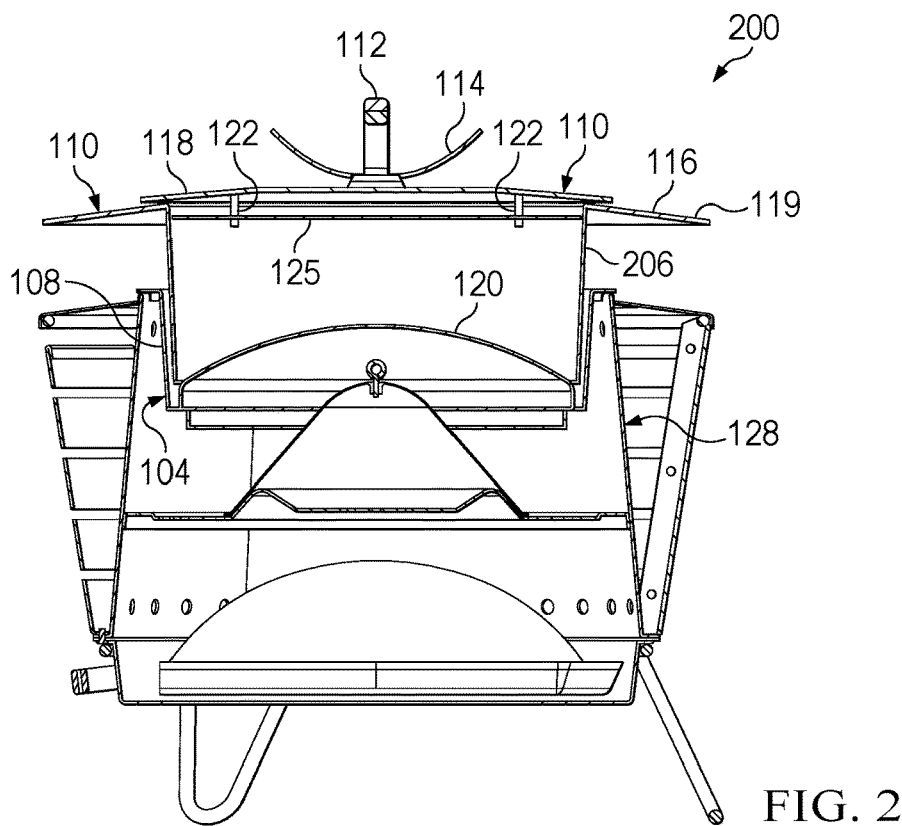
FIG. 2 is a side cutaway view of another fire pit with heat deflector according to aspects of the present disclosure shown in a stowed configuration.

Referring now to FIG. 2 a side cutaway view of another fire pit 200 with heat deflector 110 according to aspects of the present disclosure shown in a stowed configuration. The fire pit 200 may be substantially similar to the embodiment of FIGS. 1A-1E but for the use of a taller upper mesh enclosure 206 that may not be stowable completely within the base 102 and/or engine 128 and/or lower mesh enclosure 108. One benefit of a taller mesh enclosure 206 is that the deflector 102 may be more elevated from the base 102 allowing a taller fire and different heat deflection properties from other embodiments.

Figure 3A:
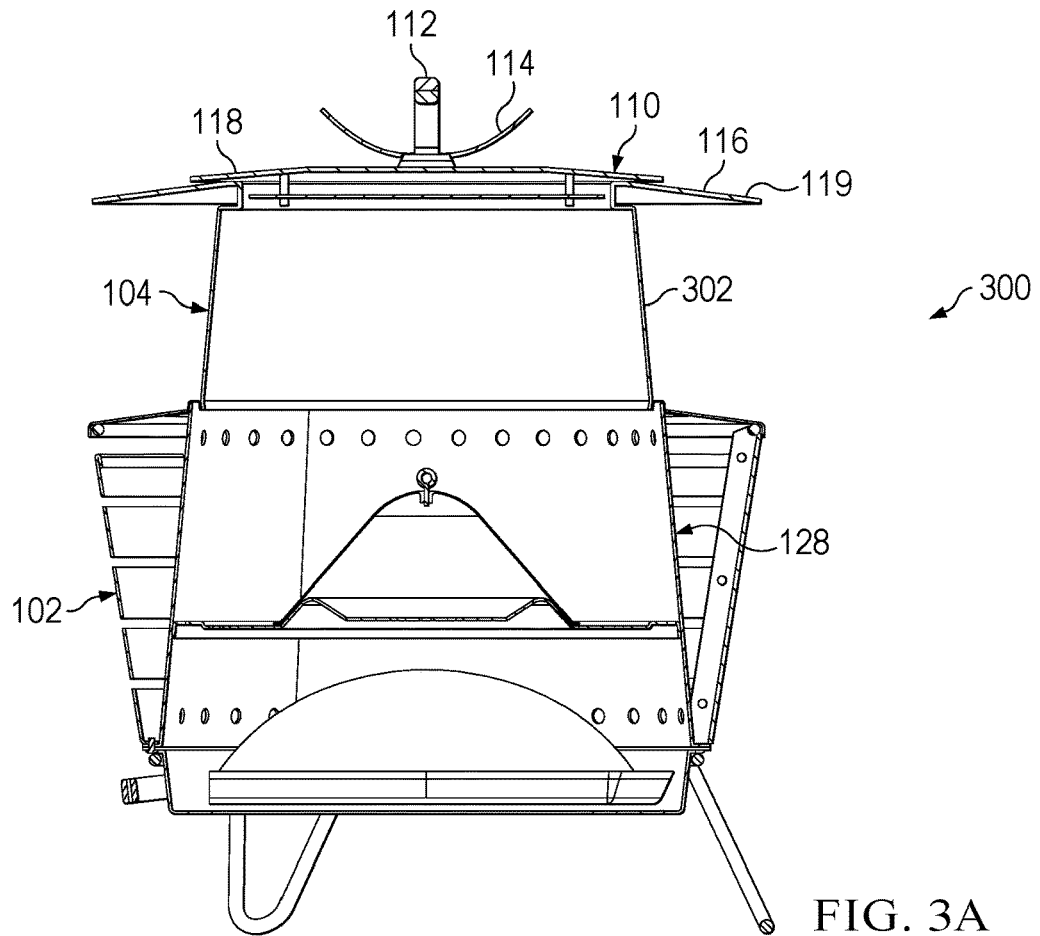
FIG. 3A is a side cutaway view of another fire pit with heat deflector according to aspects of the present disclosure shown in an operational configuration.
Figure 3B:
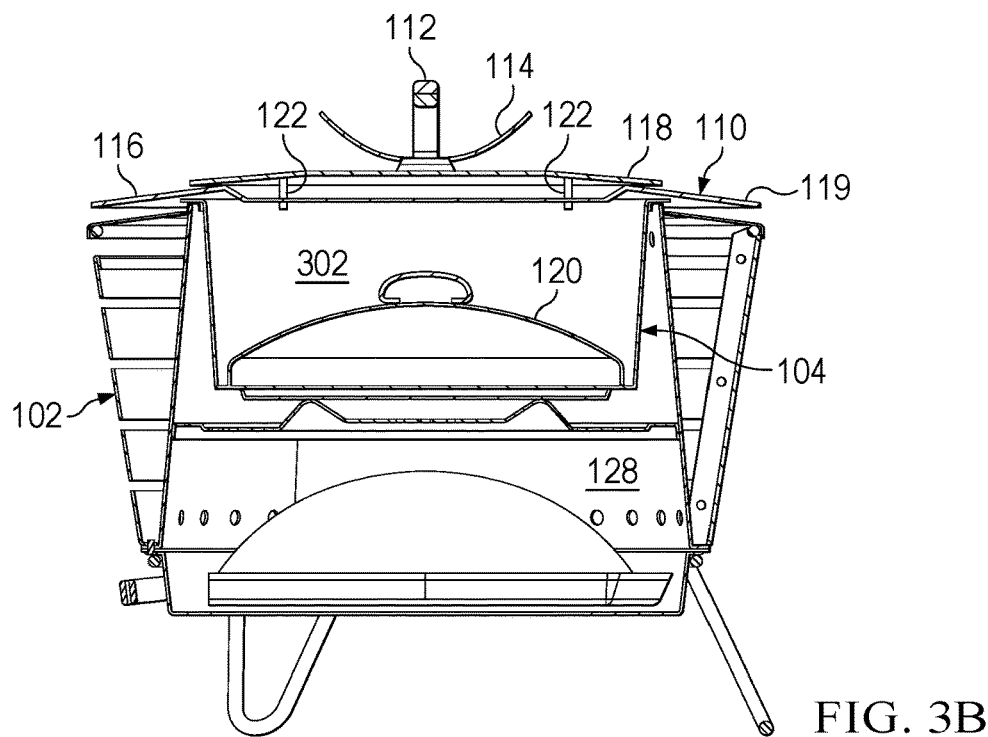
FIG. 3B is a side cutaway view of the fire pit with heat deflector of FIG. 3A shown in a stowed configuration.

Referring now to FIG. 3A, a side cutaway view of another fire pit 300 with heat deflector 310 according to aspects of the present disclosure shown in an operational configuration. FIG. 3B is a side cutaway view of the fire pit 300 shown in a stowed configuration. The fire pit 300 may be substantially similar to the embodiment of FIGS. 1A-1E but for use of a single mesh enclosure 302. The single mesh enclosure may be stowed internally as shown in FIG. 3B and provide storage for mesh dome 120.

Figure 4:
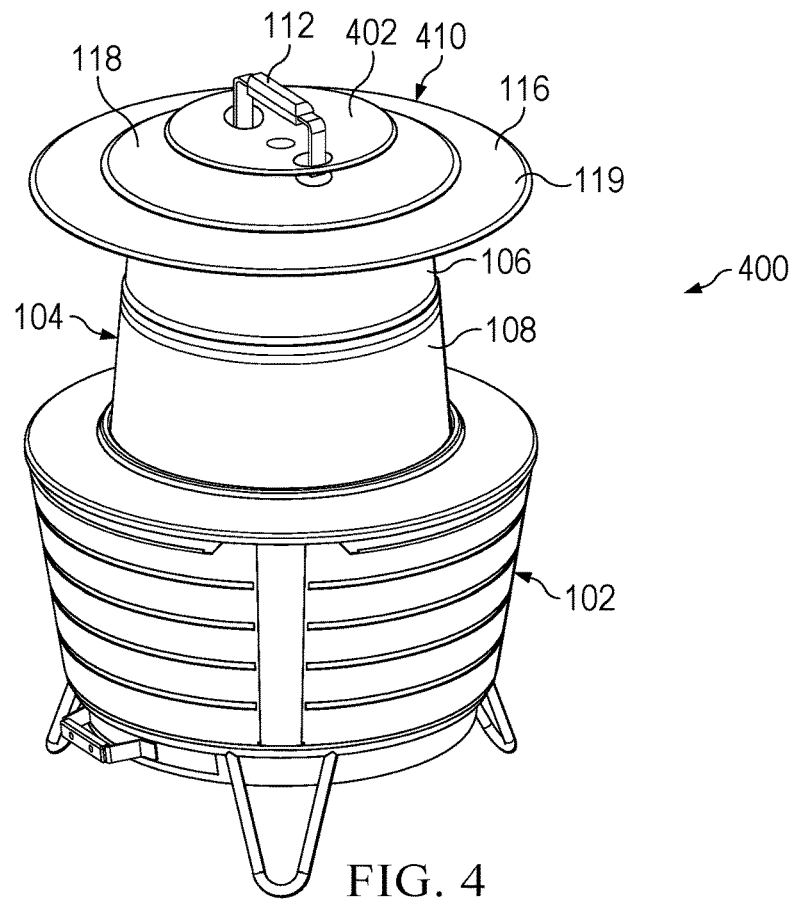
FIG. 4 is a perspective view of another fire pit with heat deflector according to aspects of the present disclosure shown in an operational configuration.

Referring now to FIG. 4 a perspective view of another fire pit 400 with heat deflector 410 according to aspects of the present disclosure shown in an operational configuration. The fire pit 400 and heat deflector 410 may be substantially similar to the components of the embodiments of FIGS. 1A-1E but for use of a dished heat deflector 402 rather than the trough shaped component 114 of FIGS. 1A-1E.

Figure 5:
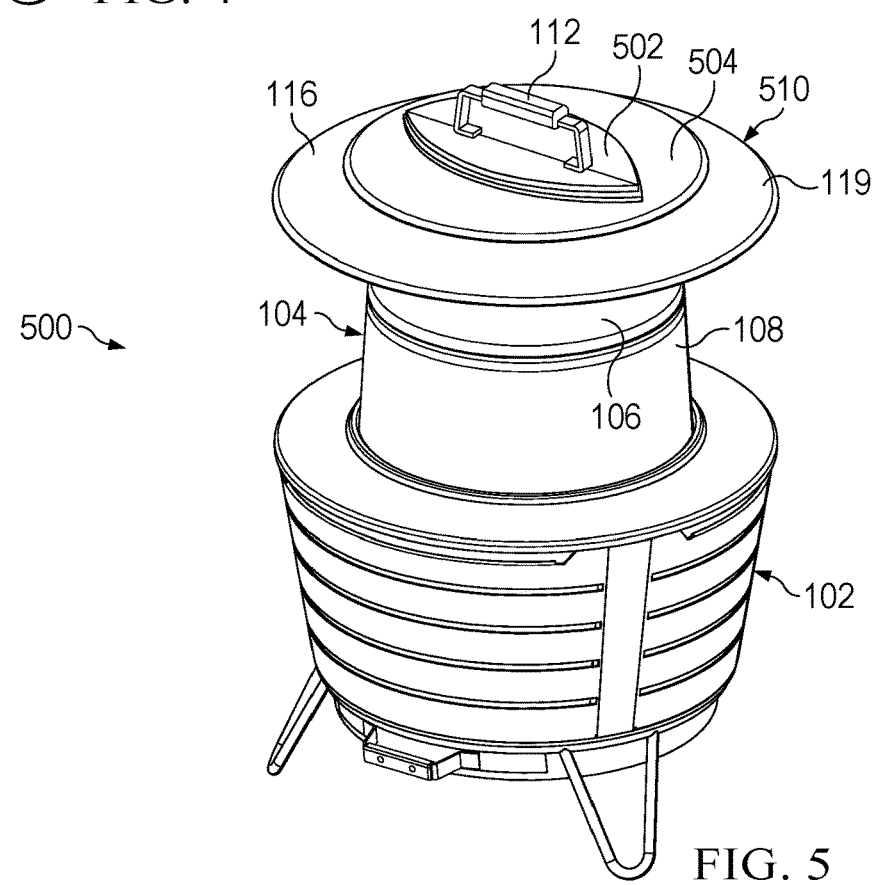
FIG. 5 is a perspective view of another fire pit with heat deflector according to aspects of the present disclosure shown in an operational configuration.

Referring now to FIG. 5, is a perspective view of another fire pit 500 with heat deflector 510 according to aspects of the present disclosure shown in an operational configuration. The fire pit 500 and heat deflector 510 may be substantially similar to the components of the embodiments of FIGS. 1A-1E except as noted. Here, a leaf-shaped shield 502 may be utilized. A cooperatively shaped recess may be provided below the shield 502 in a top panel 504 of the deflector 510.

Figure 6:
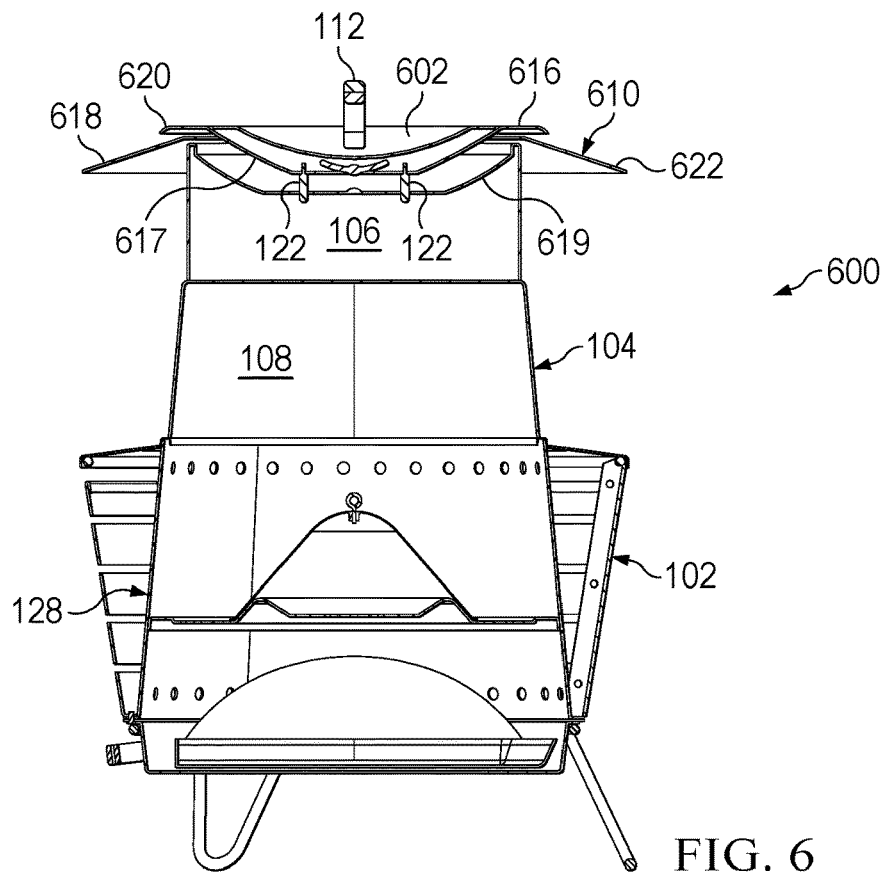
FIG. 6 is a side cutaway view of another fire pit with heat deflector according to aspects of the present disclosure shown in an operational configuration.

Referring now to FIG. 6, a side cutaway view of another fire pit 600 with heat deflector 610 according to aspects of the present disclosure shown in an operational configuration. The fire pit 600 and heat deflector 610 may be substantially similar to the components of the embodiments of FIGS. 1A-1E except as noted. Here the heat deflector 610 comprises a lower panel 618 that is dished (downward) toward a center 619 thereof. By "dished" with respect to heat deflector panels, it is meant that a portion of the panel descends downward (e.g., toward the fire pit engine 128). Dished portions of deflector panels in this and other embodiments may still have one or more flat or planar portions within the "dish" (e.g., in the center or elsewhere).

An upper panel 616, possibly connected to the lower panel in a spaced apart relationship by spacers or standoffs 122, may be dished in a cooperative or compatible way in a center 617 thereof. An outer portion 620 of the upper panel 616 may curve downward or be downwardly concave. Similarly, an outer portion 622 of the lower panel 618 may curve downward or be downwardly concave. The upper panel 616 may not cover the entirety of the lower panel 618 and may cover the central portion 619 of the lower panel 618.

A heat shield 602 interposing the panels 616, 618 and a handle 112 may be recessed or dished into the upper panel 616 but spaced apart therefrom. The more deeply dished center portion 619 of the lower panel 618 may reflect additional radiant heat from over the center of the combustion engine 128 toward the area surrounding the fire pit 600, particularly the ground surface near the fire pit 600. The multiple layers between the combustion or fire in the combustion engine 128 and the handle 112 (e.g., lower panel 618, upper panel 616, and heat shield 602) may serve to further insulate the handle 112 against radiant heating effects.

Figure 7:
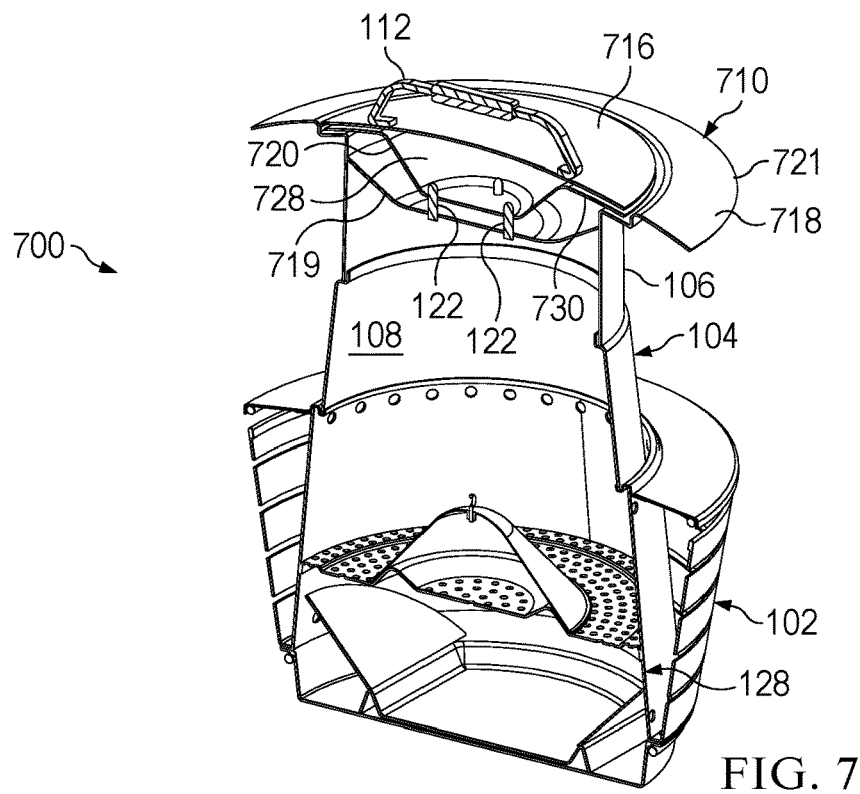
FIG. 7 is a perspective side cutaway view of another fire pit with heat deflector according to aspects of the present disclosure shown in an operational configuration.

Referring now to FIG. 7, a perspective side cutaway view of another fire pit 700 with heat deflector 710 according to aspects of the present disclosure is shown in an operational configuration. The fire pit 700 and heat deflector 710 may be substantially similar to the components of the embodiments of FIGS. 1A-1E except as noted. Here, the heat deflector 710 comprises a lower panel 718 that is dished in a center 719 thereof. The lower panel 718 may have a downward concavity on an outer circumscribing region 721 thereof. The lower panel 718 operates in a similar fashion as lower panel 618 of the fire pit 600 discussed above with respect the heat reflecting properties. An upper panel 716 supporting the handle 112 may have a concavity matching or cooperating with the outer circumscribing region 721 of the lower panel 718. An internal heat shield 720 may interpose the lower panel 718 and upper panel 716 and may dished toward a center 728 thereof. An outer circumscribing region 730 may have a downward curve to confirm with the upper panel 716. The dished center 728 of the heat shield 720 may affix to the dished center 719 of the lower panel 718 in a spaced apart relationship via standoffs or spacers 122. The heat shield 720 may affix to the upper panel 716 near an edge of the dished center 728 of the heat shield 720 but otherwise maintain a spaced apart relationship therebetween.

Figure 8:
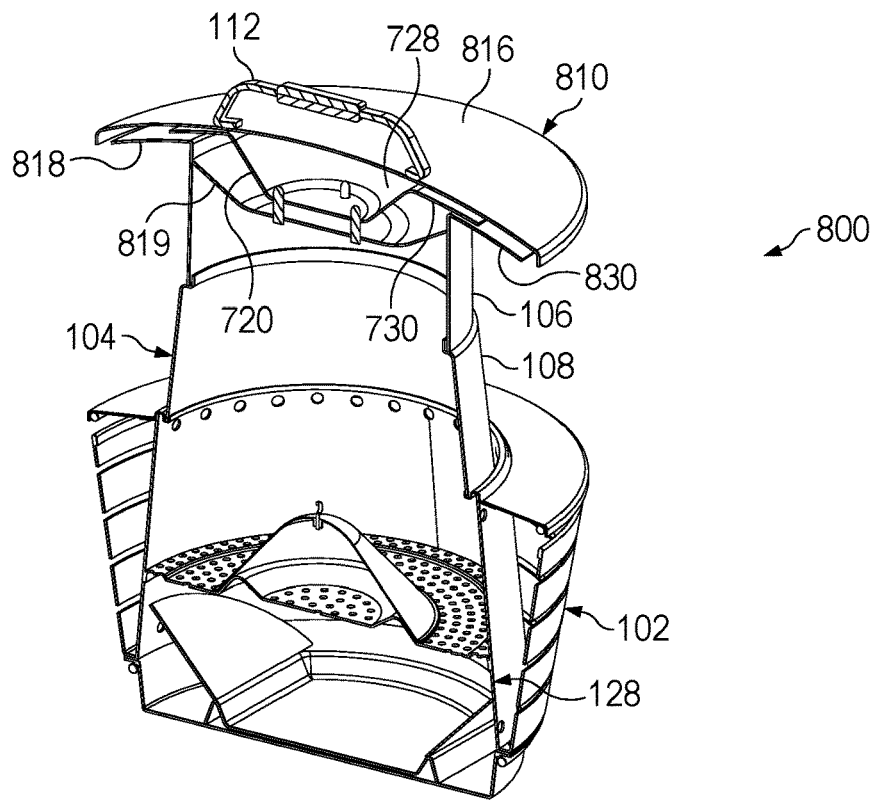
FIG. 8 is a perspective side cutaway view of another fire pit with heat deflector according to aspects of the present disclosure shown in an operational configuration.

FIG. 8 is a perspective side cutaway view of another fire pit 800 with heat deflector 810 according to aspects of the present disclosure shown in an operational configuration. The fire pit 800 and heat deflector 810 may be substantially similar to the components of the embodiments of FIG. 7 except as noted. Here a downwardly concave upper panel 816 extends over a lower panel 818 having a dished portion 819 and downwardly concave outer circumscribing region 830. Here the deflector 720 interposes the panels 816, 818 in a spaced apart relationship and extends outwardly away from the dished central portion 728 to extend at the outer circumscribing region 730 some distance between the adjacent concave portions of the panels 816, 818.

Figure 9:
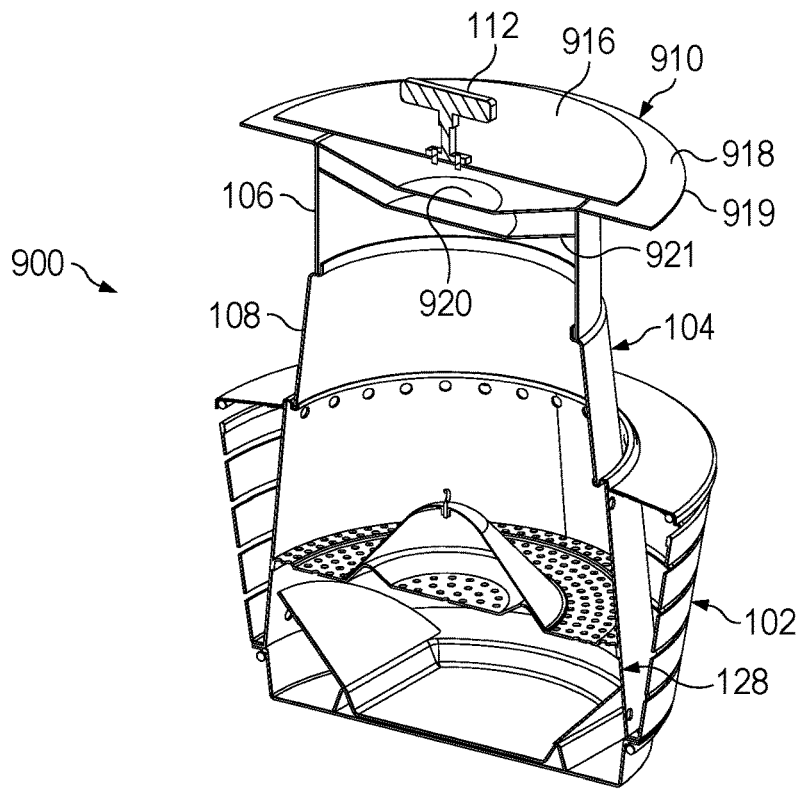
FIG. 9 is a perspective side cutaway view of another fire pit with heat deflector according to aspects of the present disclosure shown in an operational configuration.

Referring now to FIG. 9, a perspective side cutaway view of another fire pit 900 with heat deflector 910 according to aspects of the present disclosure is shown in an operational configuration. The fire pit 900 and heat deflector 910 may be substantially similar to the components of the embodiments of FIGS. 1A-1E except as noted. Here an upper panel 916 of the deflector 910 is relatively or substantially planar or flat. An outer rim, edge, or portion 919 of a lower panel 918 may also be flat, while a center portion 921 thereof is dished for heat deflection purposes. A dished internal shield 920 interposes the panels 916, 918 in a spaced apart relationship. The upper panel 916, lower panel 918, and the heat shield 920 may interconnect near an outer edge of the heat shield 920.

Figure 10:
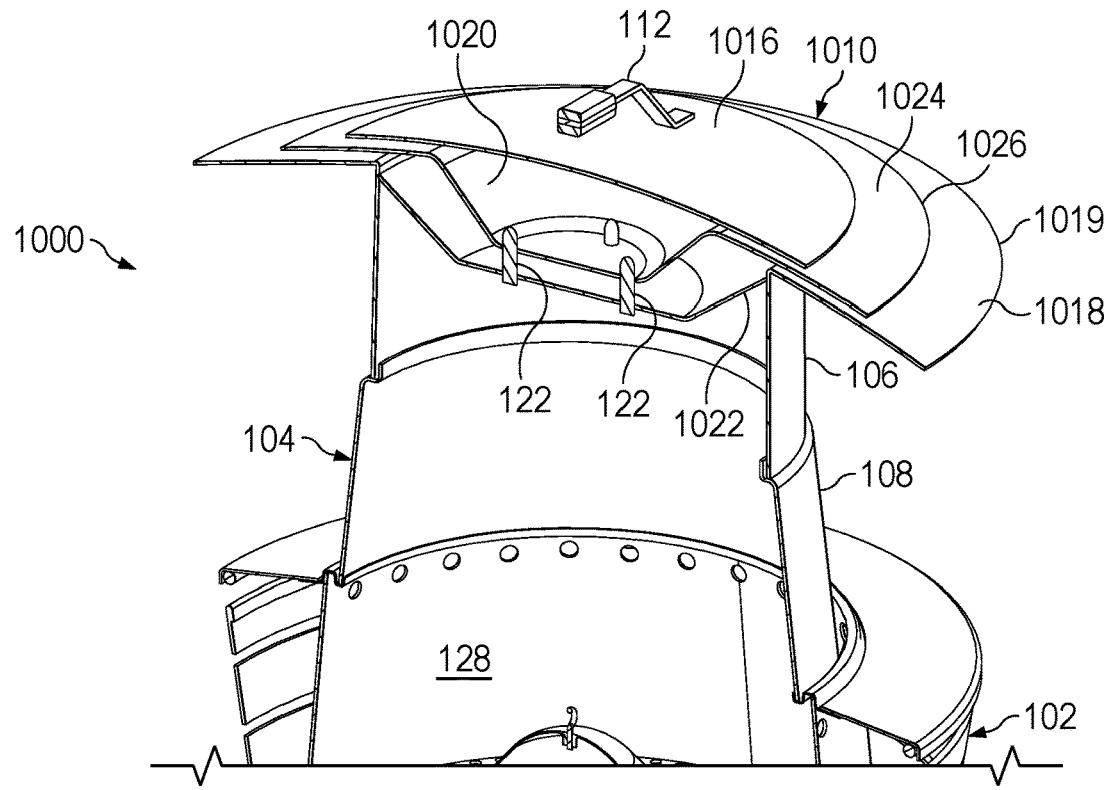
FIG. 10 is a perspective side cutaway closeup view of another fire pit with heat deflector according to aspects of the present disclosure shown in an operational configuration.

Referring now to FIG. 10, a perspective side cutaway closeup view of another fire pit 1000 with heat deflector 1010 according to aspects of the present disclosure is shown in an operational configuration. Here an upper panel 1016 is dome shaped or downwardly concave. A lower panel 1018 is downwardly convex around an outer circumscribing region 1019 but dished in a center portion 1022. A heat shield 1024 interposes the panels 1016, 1018 in a spaced apart relationship and is dished in a center 1020 thereof and connects to the lower panel 1018 center portion 1022 via standoffs or spacers 122. An outer circumscribing region 1026 of the heat shield 1024 is concave downward and extends past the upper panel 1016 and some distance over the lower panel 1018.

Figure 11:
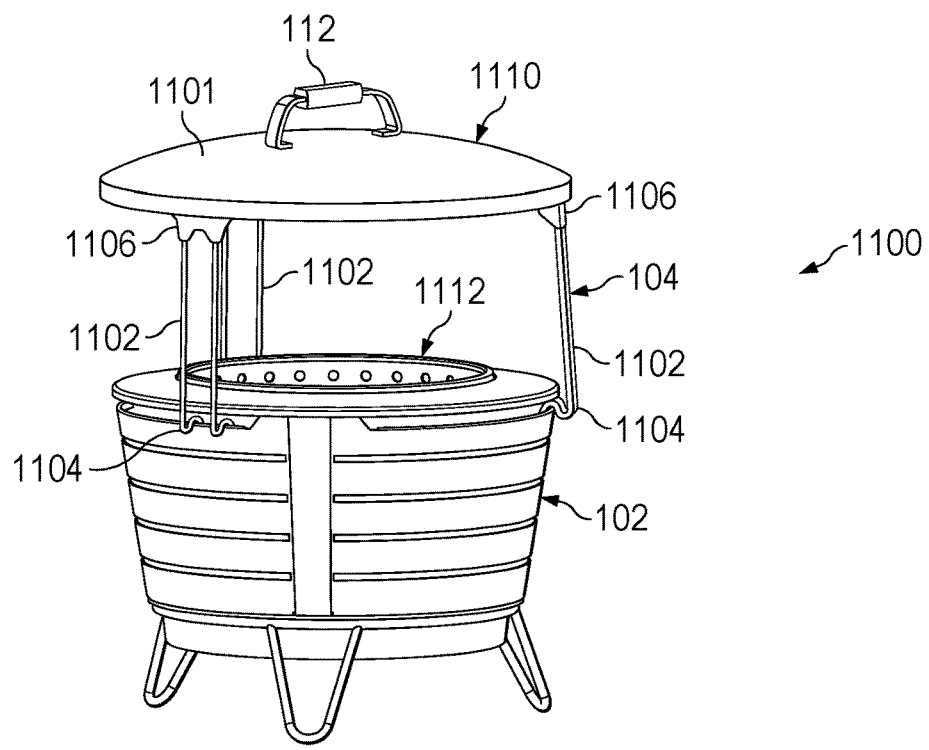
FIG. 11 is a perspective view of another fire pit with heat deflector according to aspects of the present disclosure shown in an operational configuration.

Referring now to FIG. 11, a perspective view of another fire pit 1100 with heat deflector 1110 according to aspects of the present disclosure is shown in an operational configuration. The fire pit 1100 and heat deflector 1110 may be substantially similar to the components of the embodiments of FIGS. 1A-1E except as noted. Here, the heat deflector 1110 has a simpler construction and may include only a single domed panel 1101 for heat deflection purposes. The deflector 1110 comprises a plurality of foldable legs 1102 that can fit to the base 102 with folded ends 1104, clamps, clips or other fixation mechanisms. The legs 1102 may have hinges 1106 allowing them to fold under or into the dome 1101 for stowage. It should be understood that the number, length, and appearance of the legs 1102 may vary.

Figure 12A:
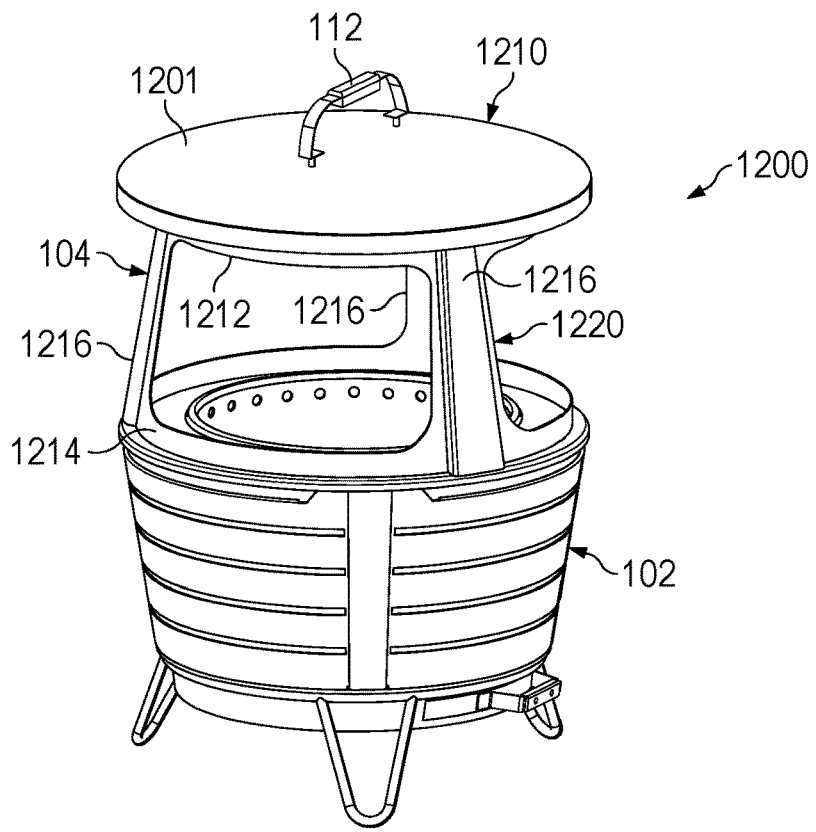
FIG. 12A is a perspective view of another fire pit with heat deflector according to aspects of the present disclosure shown in an operational configuration.

Referring now to FIG. 12A is a perspective view of another fire pit 1200 with heat deflector 1210 according to aspects of the present disclosure shown in an operational configuration. The fire pit 1200 and heat deflector 1210 may be substantially similar to the components of the embodiments of FIG. 11 except as noted. Here, a dome shaped heat deflector 1210 sits atop a support stand 1220 that interposes the base 102 and deflector 1210 when in the operational configuration. The stand 1220 may comprise an upper support ring 1212 and lower support ring 1214 for supporting or engaging the deflector 1210 and resting on or engaging the base 102, respectively. A plurality of support members 1216, legs, or beams may interpose the upper ring 1212 and lower ring 1214 and allow for access to the internals (e.g., the combustion engine) engine of the fire pit base 102. However, the stand 1220 may also vary number of support members 1216, appearance, and inconsequential details from that shown.

Figure 12B:
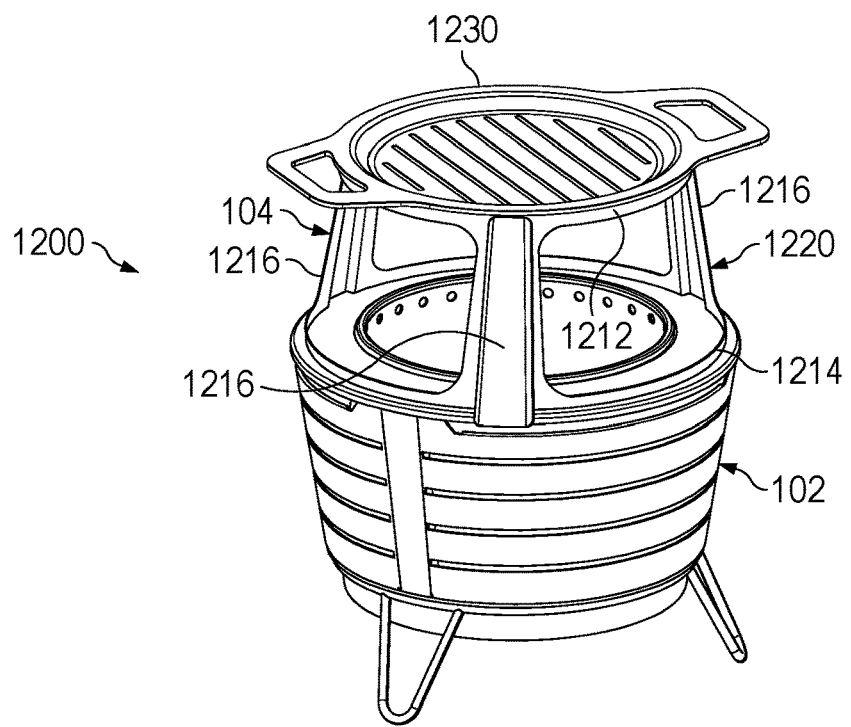
FIG. 12B is a perspective view of the fire pit of FIG. 12B shown with a cooking implement.

Referring now to FIG. 12B, is a perspective view of the fire pit 1200 of FIG. 12A is shown with a cooking implement 1230. The cooking implement 1230 may comprise a grate or griddle, for example. The cooking implement 1230 may replace the deflector 1210 in use and allow heat from the fire pit base 102 to be used for cooking or warming food items while maintaining some degree of heat deflection owing to the elevated placement of the cooking implement 1230 on the stand 1220.

Figure 13A:
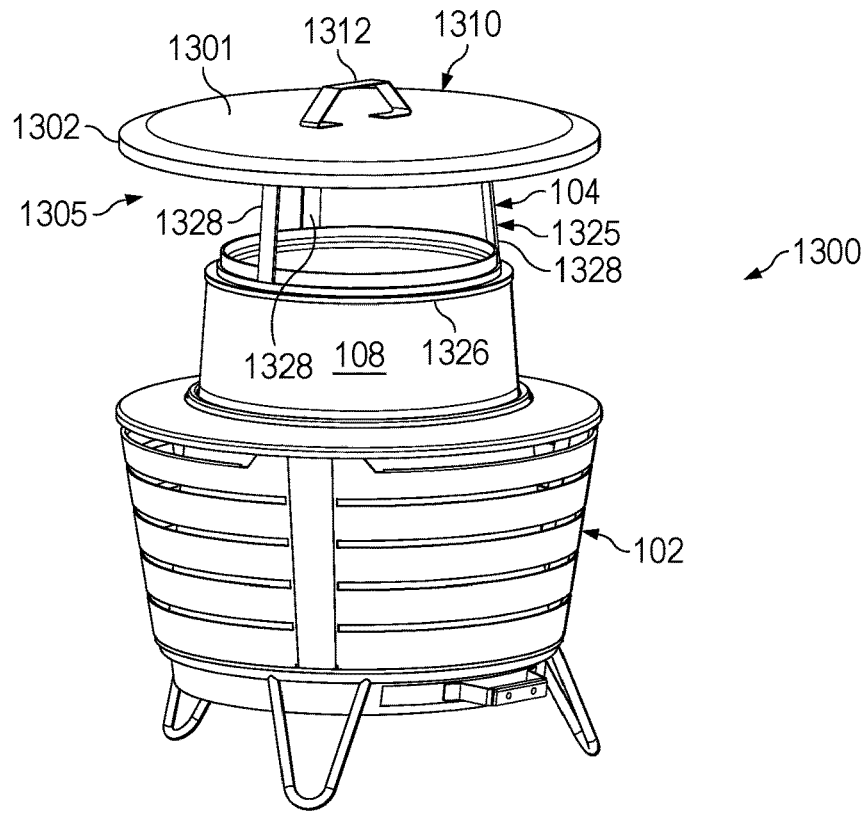
FIG. 13A is a perspective view of another fire pit with heat deflector according to aspects of the present disclosure shown in an operational configuration.

Referring now to FIG. 13A, a perspective view of another fire pit 1300 with heat deflector 1310 according to aspects of the present disclosure is shown in an operational configuration. The fire pit 1300 and heat deflector 1310 may be substantially similar to the components of the embodiments of FIGS. 1A-1E except as noted. Here, the deflector 1310 comprises a rimmed, substantially flat reflector panel 1301 with a simplified handle 1312. An integral or attached lip may descend from the panel 1301 on a perimeter thereof. The deflector 1310 sits atop of, or is engaged or connected to, an intermediate standoff 1325 that fits onto or engaged with the lower mesh enclosure 108 in place of upper mesh enclosure 106. Thus, an opening 1305 is provided between the deflector 1310 and the lower mesh enclosure 108.

The standoff 1325 may comprise a lower rim 1326 that engages with the lower mesh enclosure 106 and may be attached to a plurality of legs or support members 1328 (which may vary in number and appearance). The standoff 1325 may comprise an upper ring or support (out of frame) for supporting the heat deflector 1310, or the support members 1328 may attach directly to the deflector 1310.

Figure 13B:
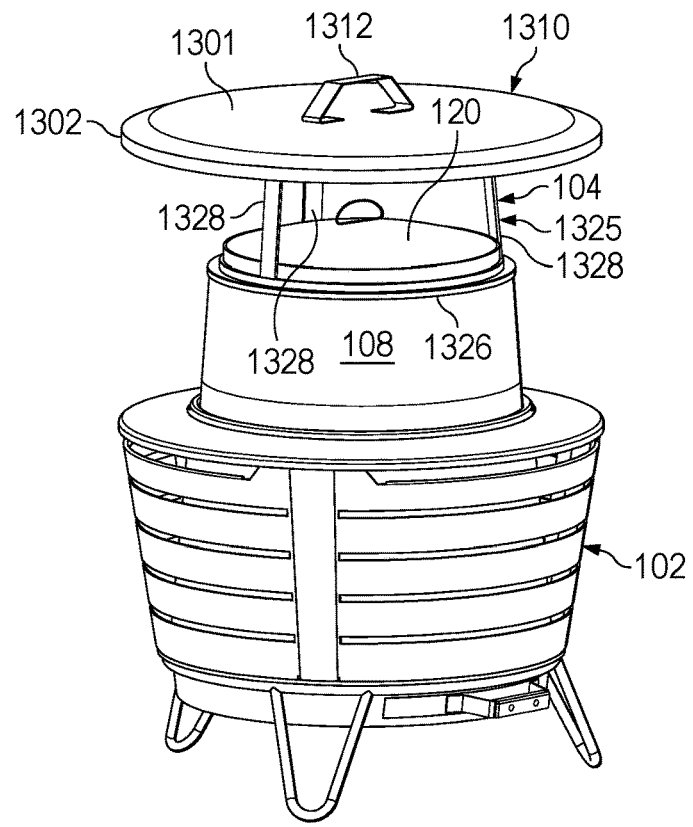
FIG. 13B is a perspective view of the fire pit of FIG. 13A shown with an additional fire screen.

As shown in FIG. 13B, an additional fire screen in the form of mesh dome 120 may fit onto the standoff 1325, possibly at the lower rim 1326, below the deflector 1310. The dome 120 may alternately, or additionally, engage or fit with the lower mesh enclosure 108.

Figure 13C:
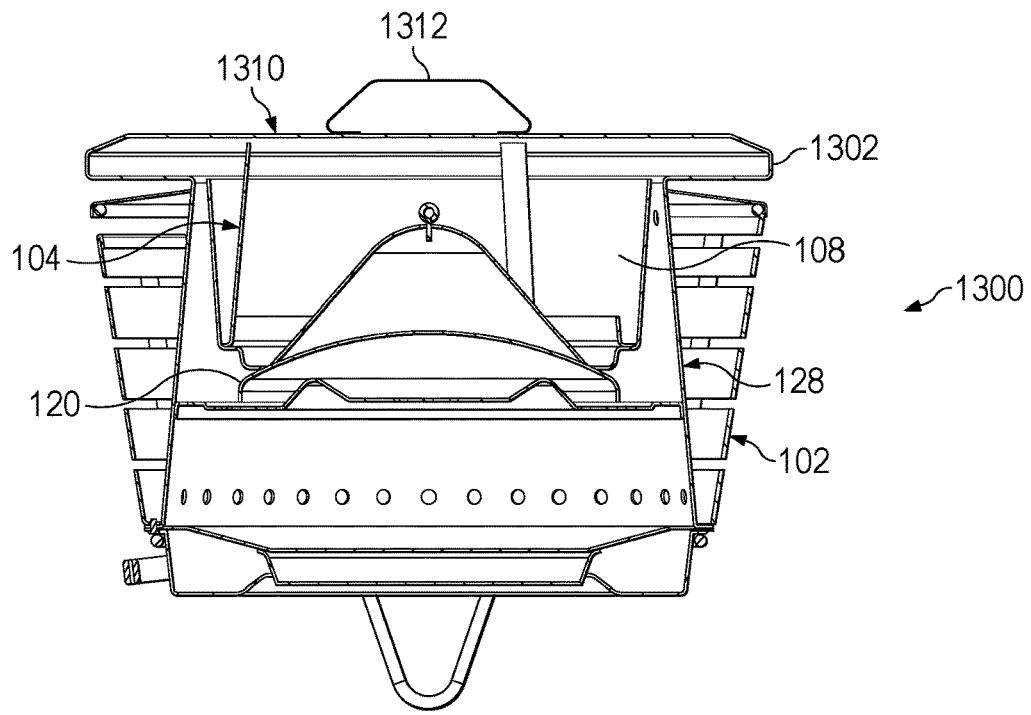
FIG. 13C is a side cutaway view of the fire pit of FIG. 13B shown in a stowed configuration.

Referring now to FIG. 13C is a side cutaway view of the fire pit of FIG. 13B shown in a stowed configuration. Here it can be seen that with the lower mesh enclosure 108 inverted, the standoff 1325 can be nested into the engine 128, base 102, and/or lower mesh enclosure 108 for storage. The lip 1302 may be sized to engage with the fire pit base 102 so as to prevent the panel 1301 from sliding or falling off the base 102.

Figure 14:
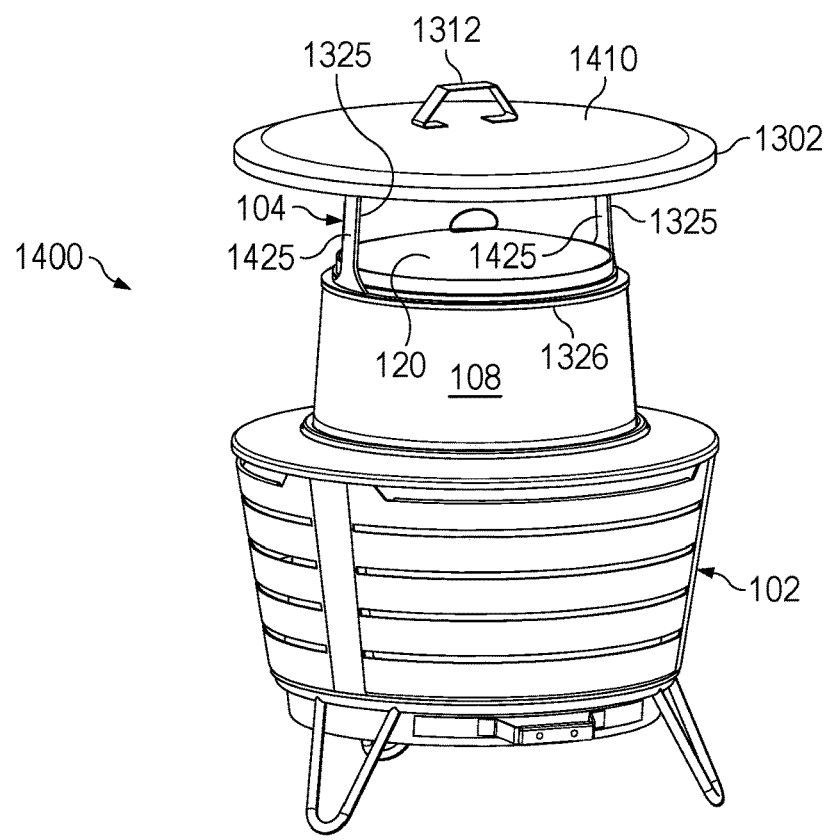
FIG. 14 is a perspective view of another fire pit with heat deflector according to aspects of the present disclosure shown in an operational configuration.

Referring now to FIG. 14, a perspective view of another fire pit 1400 with heat deflector 1410 according to aspects of the present disclosure shown in an operational configuration. The fire pit 1400 and heat deflector 1410 may be substantially similar to the components of the embodiments of FIGS. 13A-13C except as noted. Here, a stand 1425 interposing the lower mesh enclosure 108 and the deflector 1410 is shown with only two legs 1325.

Figure 15:
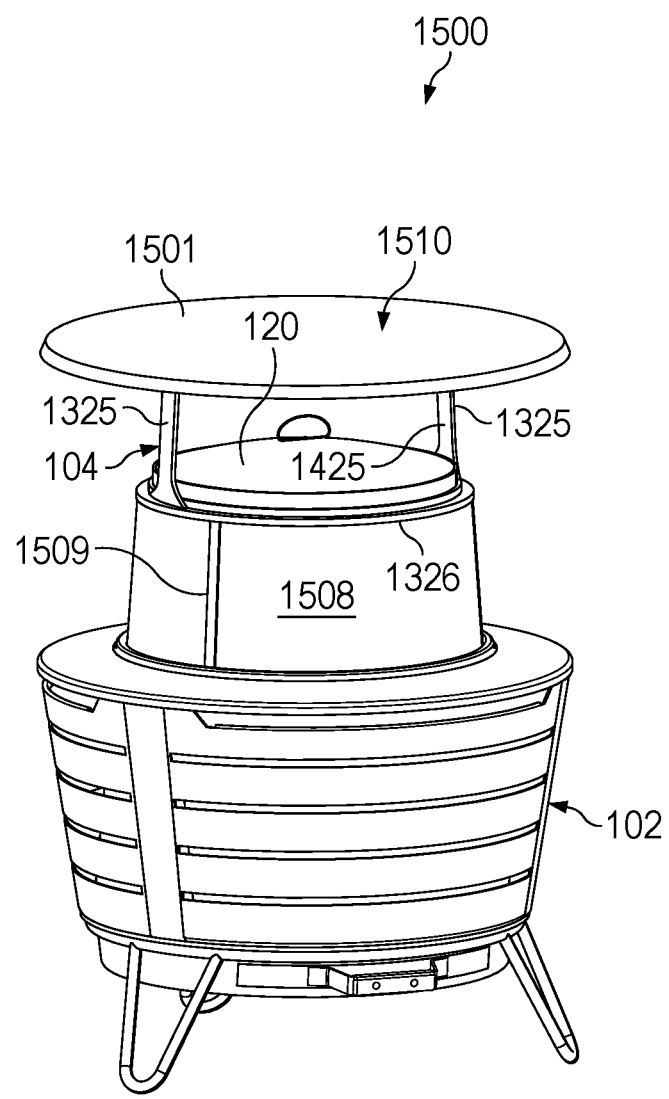
FIG. 15 is a perspective view of another fire pit with heat deflector according to aspects of the present disclosure shown in an operational configuration.

Referring now to FIG. 15, a perspective view of another fire pit 1500 with heat deflector 1510 according to aspects of the present disclosure shown in an operational configuration. The fire pit 1500 and heat deflector 1510 may be substantially similar to the components of the embodiments of FIG. 14 except as noted. Here, the deflector 1510 has a flat, rimmed upper panel 1501 that does not have a separate handle. Additionally, a lower mesh enclosure 1508 with one or more solid (e.g., non-screen and non-mesh) uprights is utilized.

It should be understood that various specific example of heat shields and associated structures and components for use with fire pits have been described. It should also be understood that other embodiments may combine various aspects of those embodiments specifically disclosed herein. Further, not every embodiment necessarily reflects all components shown in any specific example. In some embodiments, the components are limited to those described and shown, while in other embodiments other components as are known in the art may be present in addition to the components specifically shown and described.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A heat deflector for use with a fire pit comprising:
   at least one heat deflector panel; and
   a support structure engaged with the at least one heat deflector panel and supporting the at least one heat deflector panel in a spaced apart relationship with respect to the fire pit;
   wherein the support structure comprises a mesh enclosure interposing the at least one heat deflector panel and the fire pit; and
   wherein the mesh enclosure comprises a plurality of frustoconical mesh enclosures.

2. The heat deflector of claim 1, wherein the at least one heat deflector panel is supported in the spaced apart relationship with respect to the fire pit in a horizontal orientation.

3. The heat deflector of claim 1, wherein the support structure comprises a support stand having at least one leg extending between the at least one heat deflector panel and the fire pit.

4. The heat deflector of claim 3, wherein the support structure comprises a support stand having a plurality of legs extending between the at least one heat deflector panel and the fire pit.

5. The heat deflector of claim 4, wherein at least one of the plurality of legs is attached to the hear deflector panel via a hinge allowing the at least one of the plurality of legs to fold toward a center of the heat deflector panel.

6. The heat deflector of claim 1, wherein the at least one heat deflector panel is substantially flat.

7. The heat deflector of claim 1, wherein the at least one heat deflector panel is domed.

8. The heat deflector of claim 1, wherein the at least one heat deflector panel is dished at least on a center portion thereof.

9. The heat deflector of claim 1, wherein the at least one heat deflector panel comprises at least two heat deflector panels in a spaced apart relationship with respect to one another.

10. The heat deflector of claim 1, further comprising a handle affixed above the at least one heat deflector panel.

11. A heat deflector for use with a fire pit comprising:
    at least one heat deflector panel;
    a support structure engaged with the at least one heat deflector panel and supporting the at least one heat deflector panel in a spaced apart relationship with respect to the fire pit, the support structure comprising a mesh enclosure supporting a multi-legged stand that is joined to the deflector panel; and
    a domed mesh cover atop the mesh enclosure inside the stand.

12. The heat deflector of claim 11, wherein the at least one heat deflector panel is supported in the spaced apart relationship with respect to the fire pit in a horizontal orientation.

13. The heat deflector of claim 11, wherein the at least one heat deflector panel is substantially flat.

14. The heat deflector of claim 11, wherein the at least one heat deflector panel is domed.

15. The heat deflector of claim 11, wherein the at least one heat deflector panel is dished at least on a center portion thereof.

16. The heat deflector of claim 11, wherein the at least one heat deflector panel comprises at least two heat deflector panels in a spaced apart relationship with respect to one another.

17. The heat deflector of claim 11, further comprising a handle affixed above the at least one heat deflector panel.

\* \* \* \* \*